United States Patent [19]
Jaffa

[11] 3,763,776
[45] Oct. 9, 1973

[54] VACUUM PALLET TYPE SCREEN PRINTING MACHINE WITH REGISTRATION MEANS

[75] Inventor: David Jaffa, Fairlawn, N.J.

[73] Assignee: Precision Screen Machines Inc., Hawthorne, N.J.

[22] Filed: Mar. 4, 1971

[21] Appl. No.: 120,819

[52] U.S. Cl. ............................ 101/126, 101/407 BP
[51] Int. Cl. ............................................. B41f 15/20
[58] Field of Search .................... 101/114, 115, 117, 101/118, 126, 123, 124, 37, 407 R, 407 A, 407 BP; 198/138; 248/363

[56] References Cited
UNITED STATES PATENTS

| | | | |
|---|---|---|---|
| 3,536,004 | 10/1970 | Derrickson | 101/407 R |
| 2,846,946 | 8/1958 | Schwarzberger | 101/115 |
| 3,261,281 | 7/1966 | Hartmeister | 101/40 |
| 3,429,544 | 2/1969 | Williams | 248/363 X |
| 3,218,967 | 11/1965 | Childress | 101/114 |
| 662,709 | 11/1900 | Clay | 198/138 |
| 3,260,351 | 7/1966 | Miller | 198/138 |
| 3,405,795 | 10/1968 | Maschera | 198/138 |
| 3,339,698 | 9/1967 | Hartmeister et al. | 101/40 X |
| 3,543,679 | 12/1970 | Wahl | 101/35 |
| 3,486,441 | 12/1969 | Hillman et al. | 101/35 |
| 3,459,125 | 8/1969 | Forsland | 101/35 |

Primary Examiner—Robert E. Pulfrey
Assistant Examiner—R. E. Suter
Attorney—Irving Seidman

[57] ABSTRACT

This disclosure is directed to a pallet type screen printing machine in which a pallet is indexed to a printing station when an article supported thereon is screen printed. A feed table with guides is cooperatively disposed relative to the pallet at a feed station to facilitate the accurate positioning of a work piece onto the pallet. The machine comprises an endless drive for effecting movement of one or more pallets to and from a printing station in an endless path whereby the face of the pallet is always maintained in a face up position. The pallet is formed to define a vacuum chamber which is operatively connected to a source for drawing a negative pressure thereon. A flexible coupling operatively connects the pallet to the endless drive to permit limited movement of the pallet so that the pallet may be brought into accurate registration with the printing head at the printing station. Registration of the pallet in the printing station is effected by a locating cam and a cooperatively associated cam follower, which when activated, will effect the required alignment and registration of the pallet with the printing head.

17 Claims, 15 Drawing Figures

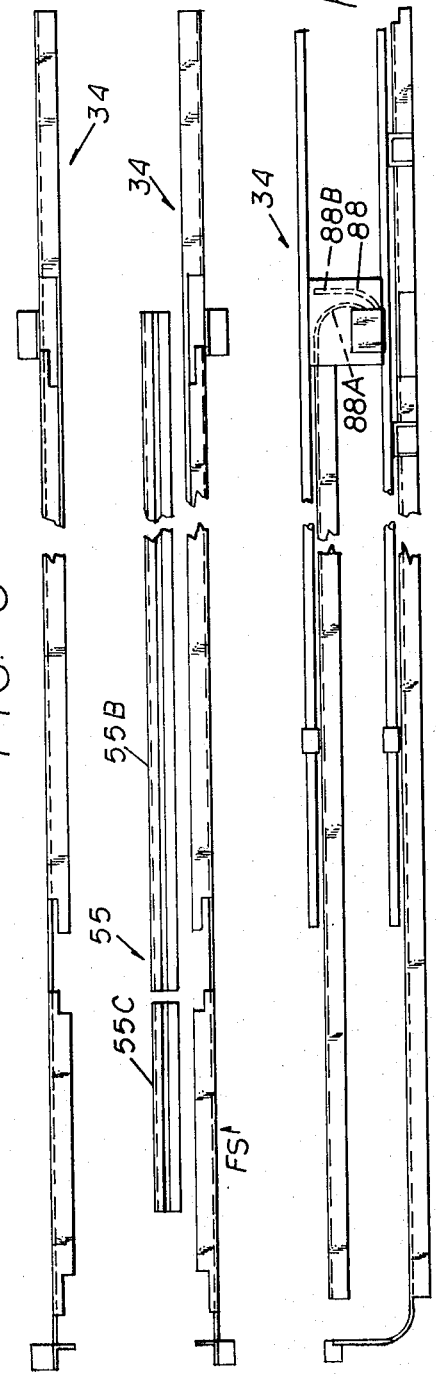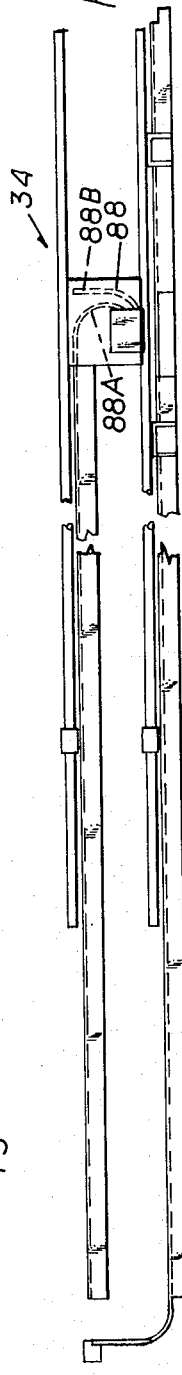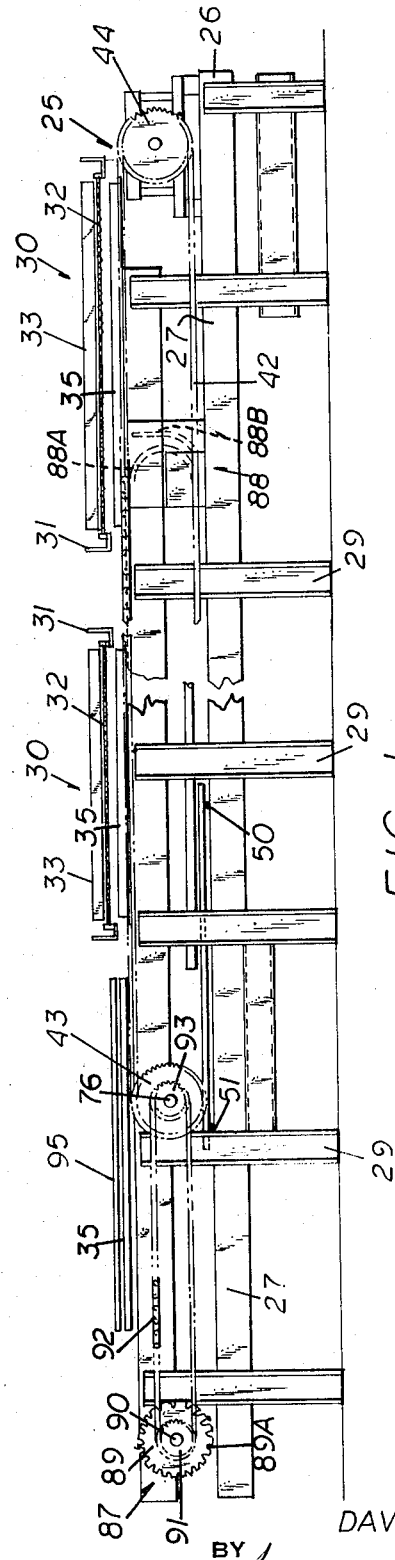
INVENTOR
DAVID JAFFA
BY Irving Seidman
ATTORNEY

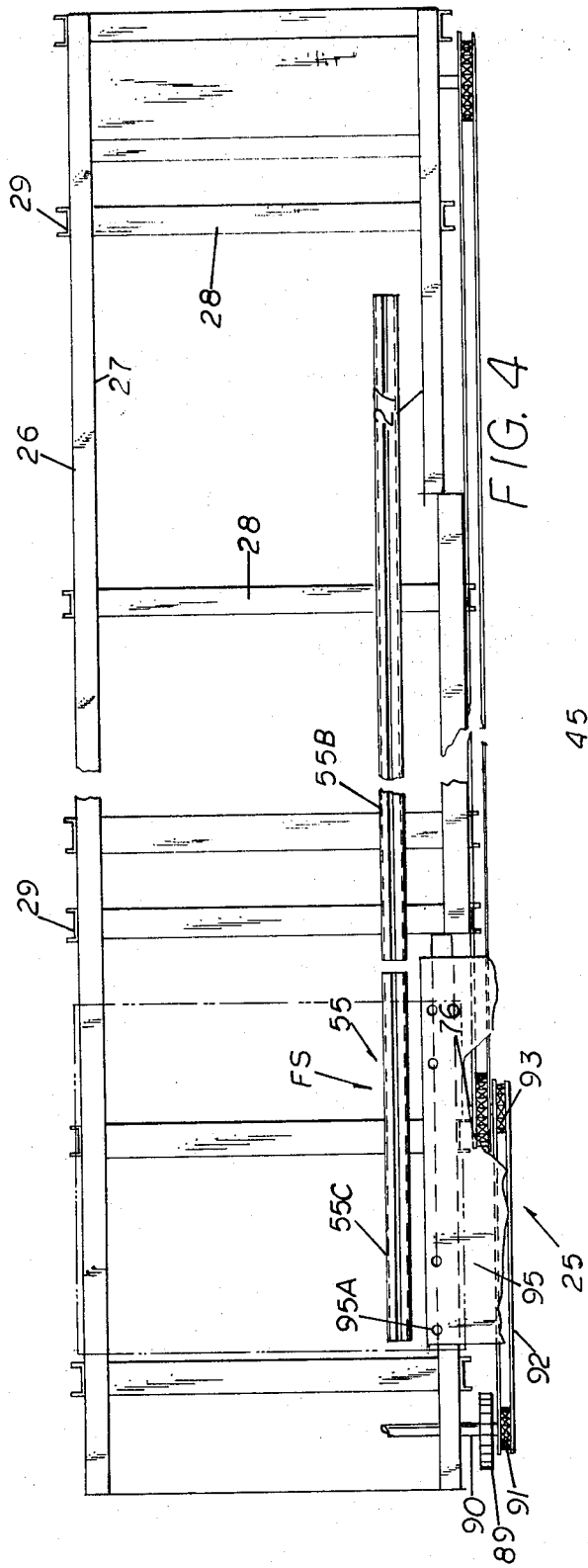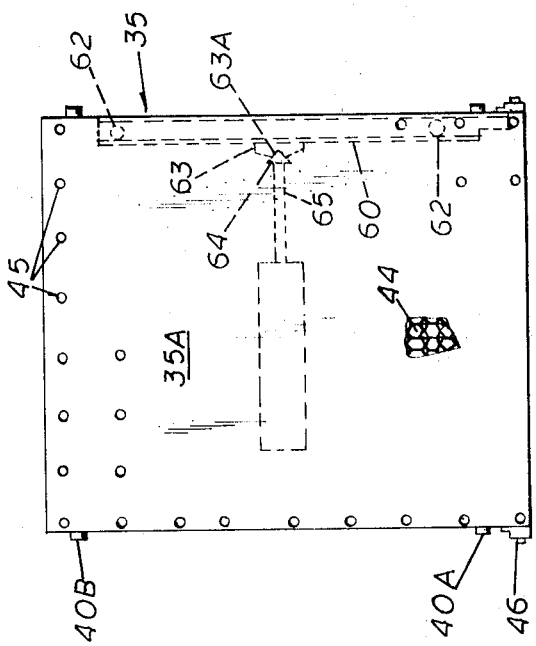

INVENTOR
DAVID JAFFA
BY Irving Seidman
ATTORNEY

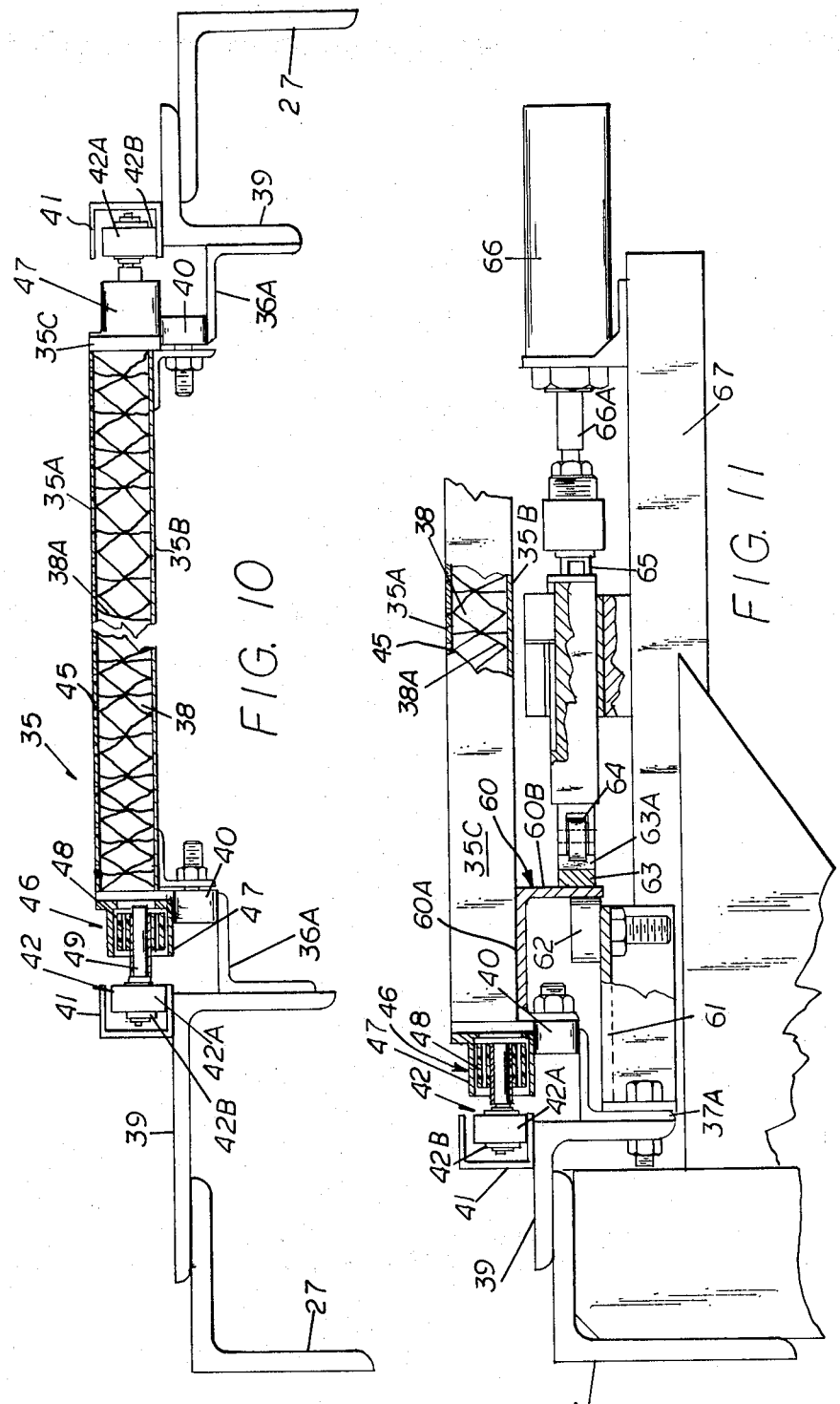

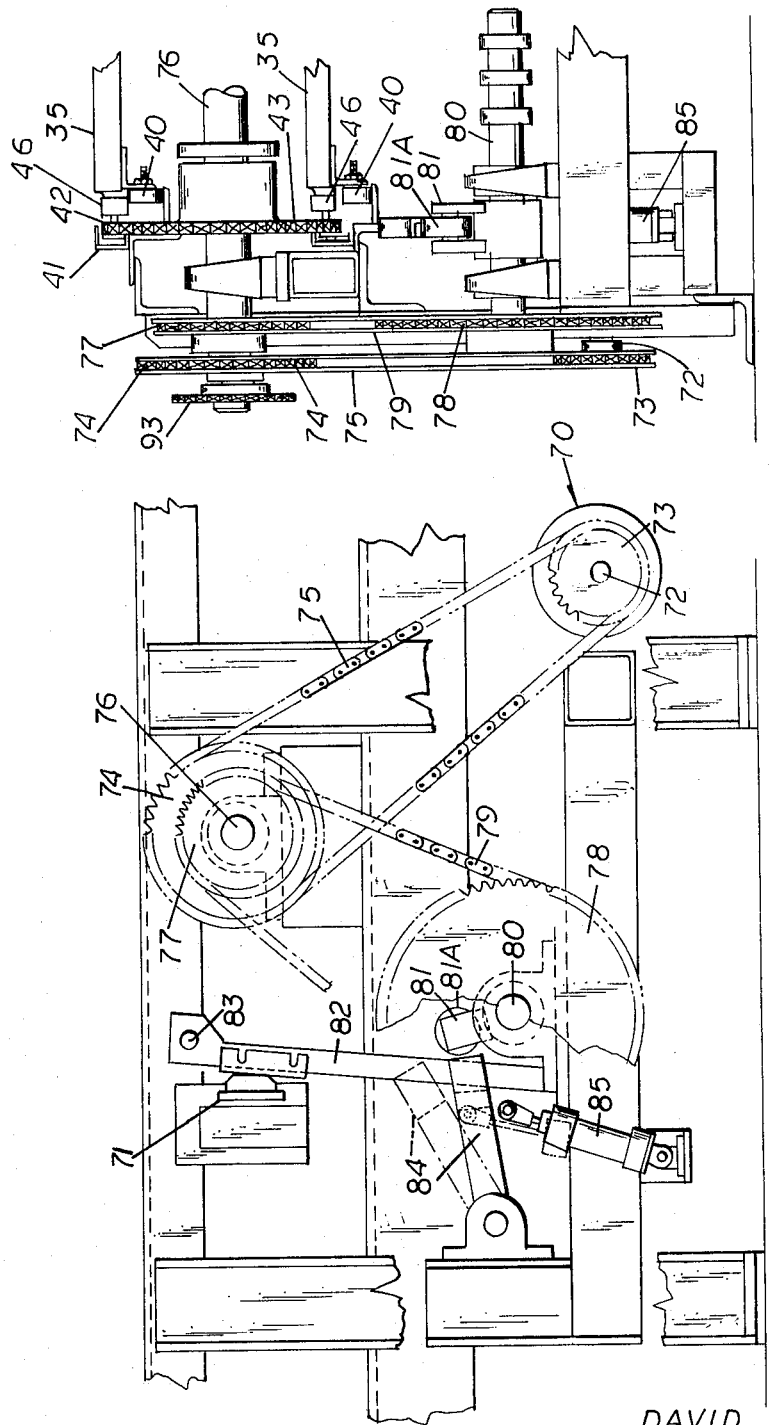

VACUUM PALLET TYPE SCREEN PRINTING MACHINE WITH REGISTRATION MEANS

PROBLEM AND PRIOR ART

It is now known in the screen printing art that endless conveyor means in the form of an endless belt can be utilized for effecting the movement of an article to be printed to and from a printing section. Non-porous articles are maintained in position on such endless belts during movement by drawing a vacuum on the belt and the article supported thereon. Porous articles, e.g., cloth, are adhesively secured to the surface of the belt. However, in either event, i.e. whether the article was maintained in position either by vacuum or adhesive, accurate registration of the article supported on such endless belt with the printing head presented some difficulties because indexing of the belt would have to be effected over relatively long distances. The problem was particularly aggrevated in multi-colored printing machines having lengths extending 50 feet or more depending on the number of color printing stations. Some of the registration difficulty resulted from the stretch induced in such belts over such long distances. Also when such endless belts were subjected to a vacuum, it was necessary to control the mode of operation (or function) of the vacuum acting on the belt and article supported thereon by changing from that of an article holding vacuum to that of an article indexing vacuum when the printing of an article at one location was completed. Consequently during the change of the vacuum function from holding to indexing, difficulty was sometimes encountered in prohibiting the article from shifting and thereby adversely affecting the registration of the article with a printing head. Also where long endless belts are employed it was frequently impossible to block out vacuum areas of the belt not utilized for either holding or indexing the article to be printed thereon. Consequently the holding ability of the vacuum would be diminished accordingly, which could effect the registration and/or holding of an article in position in place on the belt. Generally such conveyor belt type screen printing apparatus was particularly adapted for printing continuous webs, and are not particularly suitable for printing individual unit articles such as posters, and the like. Where such belt conveyors were required to be utilized in conjunction with heaters or dryers for effecting the rapid drying of the printing inks after each printing operation, it was noted that the temperatures resulting from the drying operation could adversely affect the belts. This was because the belts were generally formed of a material, e.g., a composition rubber, or leather-like material, which rendered the dissipation or conduction of heat difficult. For these reasons the dryers had to be operated at relative low temperatures to provide for the necessary dissipation of heat. This resulted in a slowing down of the machine operating time, which resulted in decreased production and increased cost.

OBJECTS

An object of this invention is to provide a screen printing machine having a movable pallet which moved toward and away from a printing station in an endless path in a manner so that the face of the pallet is always maintained in a face up position throughout its movement through the endless path.

Another object is to provide a pallet screen printing machine in which the pallet is moved into accurate registration with a printing head of a screen printing machine.

Another object is to provide a pallet screen printing machine having a source operatively connected to the pallet for drawing a negative pressure on the pallet as it is being moved to and away from a printing station to maintain an article to be printed firmly secured thereto.

Another object is to provide a screen printing machine having a plurality of movable pallets in which each pallet is independently evacuated to draw a vacuum thereon for maintaining the article in position on the respective pallets as the respective pallets are moved from station to station.

Another object is to provide a screen printing machine with movable pallets traveling in an endless path from printing station to printing station having improved means for effecting the transfer of the respective pallets between the respective flights of the endless path.

Another object is to provide a flexible coupling which permits limited relative movement of the pallet in a printing station to insure accurate registration of the article supported thereon with the printing head.

BRIEF SUMMARY OF THE INVENTION

The foregoing objects and other features of the invention are attained by a screen printing apparatus comprising a frame on which one or more printing heads are movably mounted for movement between a printing and non-printing position. Each such printing head includes a printing screen having a stencilled design and an associated squeegee cooperatively associated therewith to define a printing station.

One or more pallets are mounted on the frame for movement to the respective printing stations. Each pallet comprises spaced apart plate members defining therebetween a vacuum chamber. Connected to each pallet is an independent source for drawing and maintaining a negative pressure on the vacuum chamber of the associated pallet. Rollers are connected to each pallet for supporting the pallet in rolling engagement with a supporting track extending along the frame.

The means for effecting the drive of the pallets from station to station includes oppositely disposed flexible drive means extending along each side of the frame. Each flexible drive means is suitably threaded over end sprockets or pulleys and is driven thereby. The respective pallets are flexibly coupled to the opposed endless drive means at opposed points in a manner which will permit limited movement of the pallet relative to the flexible drive means. Registration means are cooperatively associated with each pallet when in a printing station, which when actuated, will effect alignment of the pallet to bring it into accurate registration with the associated printing head.

Transfer means are disposed adjacent each end of the frame to engage the rollers of each pallet to effect the transfer of the pallet between the respective flights of the endless drive means so that the face of the pallet is always maintained in an upright position throughout the movement thereof.

The motor means for effecting the drive of the endless drive means comprises a fluid actuated motor which is operatively associated with a deceleration means which is operated to vary the speed of the motor so as to control acceleration and deceleration of the respective pallets driven thereby as the respective pallets are moved into and out of the respective printing stations.

FEATURES

A feature of the invention resides in the provision of a flexible coupling for securing the pallet to the endless drive to facilitate individual registration of the pallet means at each printing station.

Another feature of this invention resides in the provision of a screen printing machine having an endless conveyor defined by a plurality of connected metallic pallets reinforced by a honeycomb core which functions as a very good heat conductor to effect the rapid dissipation of the heat when the apparatus is utilized in conjunction with a dryer or heater.

Another feature of this invention resides in the provision of a screen printing machine having an endless conveyor formed of a plurality of connected pallets, each having a vacuum chamber and a connected source for inducing a negative pressure on the chamber.

Another feature of this invention resides in a screen printing machine having an endless conveyor formed of a plurality of pallets with means for effecting individual registration of each pallet in a printing station.

Another feature of this invention resides in the provision of a screen printing apparatus having an endless conveyor formed of a plurality of pallets with means for continuously maintaining a negative pressure on the pallet as it is advanced from station to station.

Another feature of this invention resides in a screen printing machine having an endless conveyor formed of a plurality of pallets in which an individual unit article to be printed is carried on the respective pallets from station to station, each pallet being flexibly coupled to an endless driving means whereby the pallet may be moved relative to the driving means to effect alignment of the pallet and article supported thereon with a printing head.

Another feature of this invention resides in the provision of a screen printing machine having one or more pallets moving to and away from a printing station in an endless path wherein the pallet is always maintained in a face up position throughout its movement in the endless path.

Another feature of this invention resides in a pallet which is secured to an endless drive by means of a pair of oppositely disposed flexible couplers or bearings.

Another feature of this invention resides in the provision of a registration means cooperatively associated with each pallet when disposed in a printing station to effect accurate registration of the pallet with its printing head.

Another feature of this invention resides in the provision of a transfer means disposed at each end of the endless path arranged to guide one end of the pallet for effecting the transfer of the pallets from one flight to another of the endless drive in a manner wherein the pallet is maintained in a face up position.

Another feature of this invention resides in a drive means for effecting the drive of the pallet in a manner wherein the acceleration and deceleration of the pallet as it is moved into and out of printing position is controlled.

Other features and advantages will become more readily apparent when considered in view of the drawings and detailed description wherein:

FIG. 1 is a side elevation view of a screen printing machine embodying the present invention having portions thereof broken away, and other portions thereof diagrammatically illustrated.

FIG. 2 is a side elevation view of the track subassembly of the frame of FIG. 1 and having portions thereof broken away.

FIG. 3 is a top plan view of the track sub-assembly of FIG. 2 having portions thereof broken away.

FIG. 4 is a top plan view of the frame construction of FIG. 1.

FIG. 10 is a detailed sectional view of the pallet means taken along line 10—10 on FIG. 1, as supported on its track.

FIG. 11 is a detailed sectional view of the pallet means and associated registration means when disposed in printing position in a printing station.

FIG. 12 is a plan view of the pallet and associated registration means of FIG. 11.

FIG. 14 is a side elevation view illustrating the motor drive means for the endless drive embodied in the apparatus of FIG. 1.

FIG. 15 is an end elevation view of the motor drive means of FIG. 14.

DETAILED SPECIFICATION

Figure 13:
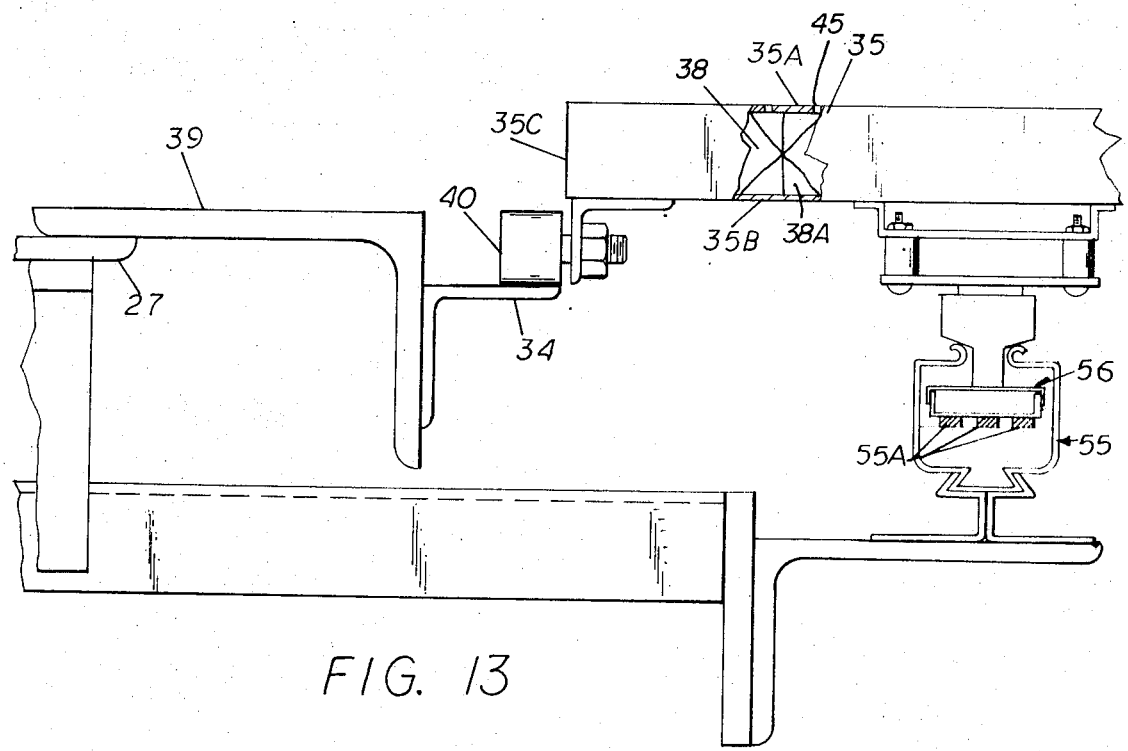
FIG. 13 is an end view of a detail of construction of the pallet means illustrating the electrical coupling between the pallet means and its associated vacuum pump.

Referring to the drawings there is illustrated therein a screen printing machine 25 embodying the present invention. The screen printing machine 25 comprises a frame 26 defined by opposed longitudinally extending side members 27 which are interconnected at spaced intervals by transversely extending tie members 28. Connected to each side of the longitudinally extending side members are a plurality of vertically disposed leg structures 29 for supporting the frame on a suitable supporting surface. As best seen in FIG. 1 the frame 26 may be made in any predetermined length for accommodating one or more printing stations or printing heads 30.

In the illustrated embodiment a plurality of printing heads 30 are disposed at spaced intervals along the length of frame 26, for color printing, each head 30 being used to print a different color. Each printing head 30 is suitably connected to the frame 26 for movement between a raised non-printing position and a lowered printing position. The respective printing heads 30 comprise a head support frame 31 (schematically illustrated) which is constructed to support thereon a printing screen 32 and an associated squeegee bar 33 and/or flood bar (the latter now shown), the squeegee forcing the printing inks through the stencilled portion of the printing screen 32 during a printing operation. The means for effecting the raising and lowering of the printing head 30 between a printing and non-printing position are well known in the art and consequently a detailed description thereof is not considered pertinent to an understanding of the present invention.

Each printing head 30 disposed along the length of the machine frame defines a printing station in which the printing is done. If desired the printing heads 30 may be spaced along the frame 26 at spaced intervals for accommodating therebetween a dryer or heater for effecting the drying of the printing inks as may be required during certain printing operations.

Figure 5:
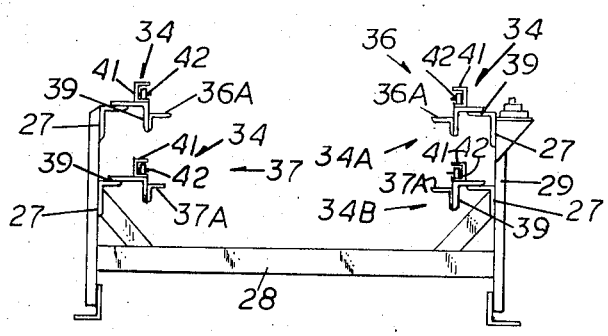
FIG. 5 is a sectional end view taken along line 5—5 on FIG. 1.

Mounted on the frame 26 between the longitudinally extending side members 27-27 are opposed track forming members 34 to define a trackway on which a pallet 35 is movably supported along the length of the frame 26 for moving toward and away from the respective printing stations 30. As best seen in FIGS. 2, 3 and 5, the track means 34 are arranged to define an upper track section 36 and a lower track section 37 of an endless pathway for the pallet 35, as will be hereinafter described, along the frame structure. As best seen in FIG. 5 the upper and lower tracks 36, 37 are similarly constructed, each track 36, 37 being defined by oppositely disposed angle members 36A, 36A and 37A, 37A, respectively which are suitably secured to a bracket or support 39 extending inwardly from the opposed side structure 27 of the machine frame. The horizontal flange of the opposed track members 36A, 36A and 37A, 37A defines the rail portion for supporting the pallet rollers 40 mounted on each side of the pallet means 35, as will be hereinafter defined.

Each pallet 35 is disposed in rolling engagement with the rail or track 36, 37 to transverse thereover as will be herein defined.

Cooperatively associated adjacent each rail or track member 36A, 36A and 37A, 37A is a channel-shaped member 41 which forms a guide or housing to accommodate the flights of an endless flexible drive 42. The endless flexible drive 42 in the illustrated embodiment comprises a chain 42, of connected links 42B, suitably threaded about end sprockets 43 and 44 rotatably journalled adjacent the opposed ends of the frame. It will be understood that a flexible drive 42 extends along each side of the frame 26. See FIG. 5. Drive chains 42 define an endless path through which the respective pallets 35 connected thereto are moved. The pallets 35 are connected to the opposed chain drive 42 so as to be driven thereby. Each pallet 35 is defined by an upper and lower plate member 35A, 35B which are suitably interconnected by a circumscribing end wall 35C to define therebetween a vacuum chamber 38. As best seen in FIG. 10 an open lattice or honeycomb-like structure 38A is interposed between the respective plate members 35A, 35B to provide the necessary reinforcement. The upper plate member 35A is also provided with a series of small apertures 45 disposed in open communication with the vacuum chamber 38 defined between the plate members 35A, 35B. The bottom member 35B is rendered imperforate and the reinforcing honeycomb-like structure is made so that the cells thereof are disposed in communication or interconnected to permit the free flow of air within said chamber 38.

Figure 9:
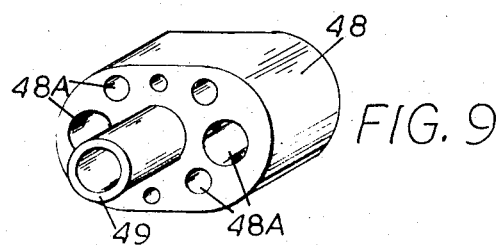
FIG. 9 is an enlarged detail of the flexible connection between the pallet and the drive means.

As best seen in FIGS. 10 and 11 the respective pallets 35 are connected to the opposed drive chains 42 by a flexible bearing or coupling means 46. On the opposed side portions of the respective pallets 35 adjacent the leading end of the pallet 35 there is provided a chain attachment housing 47. The housing 47 is slightly oval and is adapted to receive a flexible coupling or bearing 48. The flexible bearing or coupling 48 comprises a member formed of a resilient material, as for example, rubber or the like, which may be provided with one or more bores or openings 48A (See FIG. 9) extending therethrough. Connected to the bearing 48 is a pin or link 49 which connects to the rollers 42A of the drive chains 42. In operation the flexible bearing defines the drive connection for the pallet, and functions as a cushion to permit relative limited movement of the pallet 35 relative to the drive chains 42, as will be hereinafter described in more detail. The arrangement is such that each pallet 35 is connected by opposed attachments 46-46 to the respective drive chains 42 to define a two-point attachment for the respective pallets and in driving chains 42.

Figure 6:
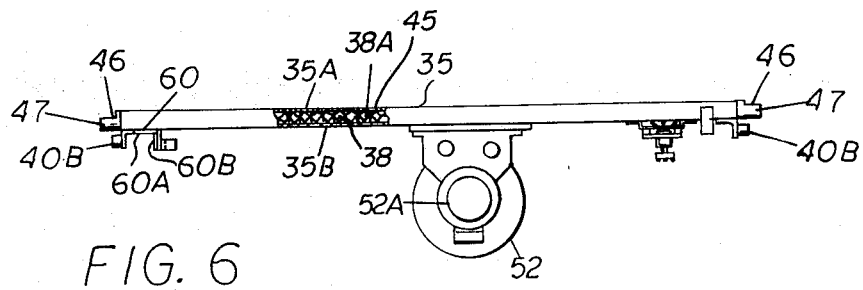
FIG. 6 is a detailed end view of a pallet construction utilized in the screen printing machine of FIG. 1.
Figure 7:
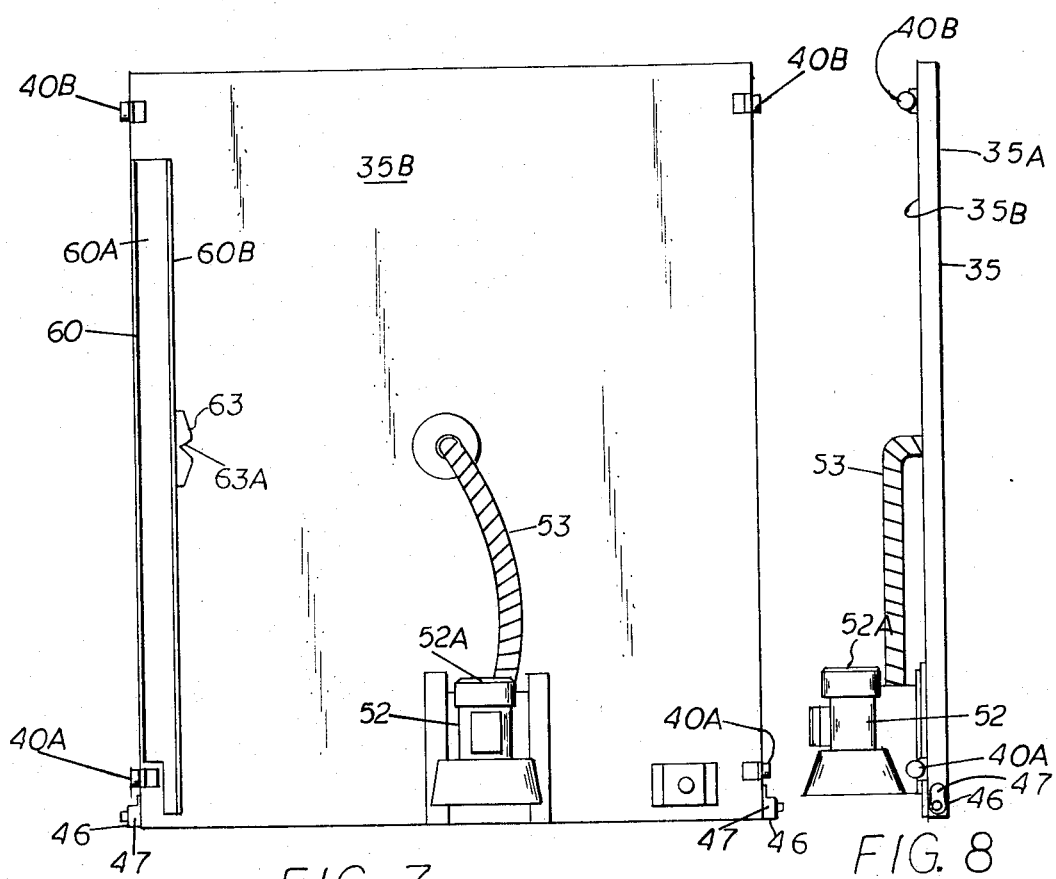
FIG. 7 is a detailed bottom view of the pallet construction of FIG. 6.
Figure 8:
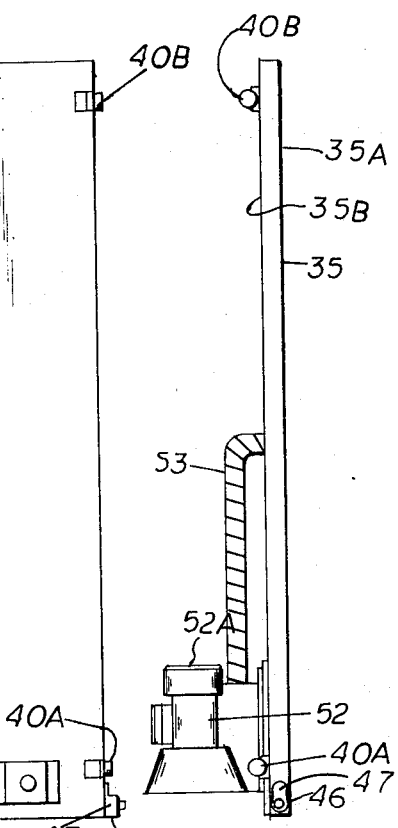
FIG. 8 is a side elevation view of the pallet construction of FIGS. 6 and 7.

As seen in FIGS. 6 to 8 the respective pallets 35 have connected to the opposed sides, front and rear rollers 40A and 40B by which the pallet 35 is disposed in rolling engagement with the rail members 36A, 36A, 37A, 37A. The arrangement is such that as the endless chains 42-42 are driven, the respective pallets 35 connected therebetween will be pulled along the length of the frame for movement from station to station.

Operatively associated with each of the pallets 35 is an electrically operated vacuum pump 52 which is suitably secured to the underside of the pallet 35, and is carried therewith as the pallet is moved along 4he length of the frame in its endless path. The outlet of the pump 52 is suitably connected in communication with the interior or the vacuum chamber 38 of the associated pallet 35 through a connecting conduit 53. Each pallet 35 is thus provided with its own independent pump for drawing a vacuum pressure on the chamber 38 of the pallet means 35.

The vacuum pump is activated by an electric motor means 52A. The operation is such that the vacuum, when utilized, is maintained continuously operative as the pallet 35 is advanced from station to station. The operation of the vacuum pump is rendered continuously operative by an electric commutating track 55, see FIG. 13, extending along the frame. The electric track 55 (See FIGS. 3 and 13) is provided with suitable electric rails or conductors 55A which are operatively wired in an electric circuit to a source of electrical energy. (Not shown.) Connected to the underside of each pallet is an electric trolley means 56 which is adapted to ride in electrical contact with the electric rails or conductors 55A. The trolley 56 in turn is electrically connected to the motor 52A of the vacuum pump so that when trolley 56 is electrically connected to electrical rails 55A, the motor 52A and vacuum pump is energized; and it is maintained energized as long as trolley 56 is maintained in sliding contact with electric rail 55A.

As best seen in FIG. 4, the electric track 55 comprises two sections 55B and 55C, each supporting electrical conducting rails 55A. The main portion 55B of the electric track 55 extends beyond the feed station FS and continues along the remaining length of the frame 26. The arrangement is such that when the pallet trolleys 56 ride this portion 55B of track 55, the vacuum pump 52 is activated if current is flowing through conductors track 55 55A or B. Thus once the electric trolley 56 of the pallets 35 engages track section 55B, the vacuum pump 52 is maintained constantly activated as the pallets 35 advance from station to station. A second portion 55C of the track 55 which forms the continuation of the first track portion 55B, but with the conducting rails electrically insulated from those of sections 55B, is disposed at the feed station FS. This second track portion 55C is operatively connected to a suitable switch (not shown) so that the current flowing through the conducting rails of this section of the track 55C is controlled independently of track section 55B. The switch controlling the current to track section 55C can be actuated by an operator at the will of the operator to facilitate the positioning of an article on the pallet 35 associated with track section 55C, without affecting the vacuum operating on the other pallets 35. In operation, an operator feeding the articles to be printed on the pallet 35 in the feed station FS will normally deactivate the vacuum pump 52 operating on the pallet in the feed station when placing the article to be printed thereon. When the article has been properly orientated into its proper position on the pallet 35 in the feed station FS, the operator then will energize the vacuum pump 52 to draw the vacuum on the pallet in the feed station to maintain the article orientated in position thereon. Thus at the feed end of the machine the vacuum pump can be operated between an on and off position. As the pallet in the feed station FS advances to the first printing station, the trolley 56 connected thereto slides off portion 55C and onto portion 55B of the electric track. In doing so the vacuum pump 52 of the pallet 35 is brought under the influence of the current flowing through track portion 55B whereby it functions to maintain the vacuum pump 52 actuated throughout the movement of the pallet 35 through the succeeding printing stations. As the trolley 56 of the pallet 35 is moved beyond the end of track section 55B, the current flow to the vacuum pump motor is interrupted, thereby releasing the vacuum on chamber 38. When this occurs the article which has been printed can be removed from the pallet 35.

Each pallet 35 is provided with independent means for effecting registration of the pallet 35 with respect to an associated printing head 30 when the pallet 35 has been advanced to a printing station. The arrangement is such that the pallet 35 can be accurately registered to accommodate or compensate for any slack or play in the flexible drive 42. As the respective pallets 35 are connected to the respective endless drives 42 by a two-point connection, each containing a flexible bearing or coupling 48, the pallets 35 may be moved or shifted relative to the chain 42 an amount sufficient to bring the respective pallets 35 in accurate registration with the printing head 30. The means for effecting the registration of the pallet 35 at the printing station comprises a an angled member 60 connected to the undersurface of the pallet 35. As best seen in FIGS. 6 and 7, the horizontal flange 60A of the angled member 60 is suitably secured to the bottom plate 35B of the pallet 35. The dependent flange 60B extends downwardly from the pallet and transversely thereof. Mounted to the frame at each printing station is a bracket 61 (see FIG. 11) on which a pair of spaced apart stop rollers 62 are positioned. The stop rollers 62 function as a lateral stop to limit lateral displacement of the pallet 35 as the pallet is moved into registration. The arrangement is such that when the pallet 35 is laterally displaced to effect registration, lateral movement is limited by engagement of flange 60B with stop rollers 62. When the pallet is laterally displaced for registration, the pallet 35 is squared relative to the printing station as the flange 60B engages stop rollers 62.

The means for effecting the squaring or registration of the pallet relative to its printing head comprises a locator 63 having a V notch 63A formed therein. The locator 63 is connected to the depending flange 60B of member 60. Cooperatively associated with the locator 63 is a follower in the form of a roller 64 connected to the end of a push rod 65 of a piston and cylinder activating means 66. The piston and cylinder assembly 66 is suitably supported on a supporting bracket 67 connected to the machine frame 26 in each printing station. The arrangement is such that the push rod 65 of the roller 64 is operatively connected to the piston rod 66A of the piston and cylinder assembly 66. Accordingly, whenever the piston and cylinder assembly 66 is actuated the push rod 65 advances the roller 64 towards the notch 63A of the locator 63, and as the roller 64 is seated into the V-notch 63A, the pallet 35 is displaced or squared accordingly as the depending flange 60B of the member 60 is moved into abutment against the stops 62. The pallet 35 is thus squareed in registration with the printing head 30 so that the article to be printed, supported thereon, can be located in accurate registration with the stencilled portion of the printing screen 32 supported on the printing head 31. As the electric trolley 56 is operatively connected in circuit to the vacuum pump 52 carried on the pallet 35 by engagement in electrical contact with the supply of the electric track 55B, the vacuum is maintained on the pallet as it is brought into registration. Where the apparatus 25 is provided with a plurality of printing stations, the arrangement is such that the pallets 35 are individually capable of being brought into registration at each printing station while the vacuum is maintained thereon.

As best seen in FIGS. 14 and 15 the drive means for the endless drive or chain 42 comprises a motor means. In the illustrated form of the invention a fluid actuated or hydraulic motor 70 is employed. The hydraulic motor 70 is operatively connected to a control valve 71 for controlling the fluid flow to motor 70 by which the speed of the motor 70 is regulated. The output shaft 72 of the fluid motor 70 has connected thereto a sprocket 73 which is connected in driving relationship to a drive sprocket 74 by means of a chain drive 75 interconnected therebetween. The drive sprocket 74 is connected to the main drive shaft 76. Journalled to the main drive shaft 76 is the driving sprocket 43 of the endless chain drive 42. As best seen in FIG. 1 the drive sprocket 43 of the drive chain 42 is connected adjacent the feed end FS of the machine. The other end of the chain drive 42 is threaded over end idle sprocket 44.

Connected to the main drive shaft 76 is a drive sprocket 77 for effecting the indexing or advancing of the pallets 35 toward and away the repsective printing stations. As shown in FIGS. 14 and 15 the drive indexing sprocket 77 is connected in driving relationship to an indexing sprocket 78 by means of a connected driving chain 79. Operatively connected to the shaft 80 of the indexing sprocket 78 is a rotating ram 81 and ram roller 81A which function to control the fluid flow to the motor 70. An actuating lever 82 is pivoted about pivot 83 for movement toward and away from the valve 71 controlling the flow of fluid to motor 70. The arrangement is such that rotation of the ram 81 and roller 81A as the indexing shaft 80 is rotated effects displacement of the lever 82 to control the actuation of valve 71. To limit the rotation of the ram 81 there is provided a ram stop 84 which is actuated between operative and inoperative position by means of a piston and cylinder assembly 85. As viewed in FIG. 14 when the ram stop 84 is raised to its upper position, as indicated in the dotted line showing thereof, the shaft 80 containing the ram 81 and ram roller 81A is permitted to rotate thereby causing the ram roller 81A to engage the actuating lever 82. The engagement between the ram roller 81A and the actuating lever 82 is such that as the displacement of the actuating lever 82 activates the control valve 71 controlling the flow of fluid to the motor to effect the speed thereof, the arrangement is such that as the pallet 35 approaches the printing position, the speed of the motor is gradually reduced due to the reduction in flow of fluid thereto and thereby resulting in the controlled deceleration of the pallet as it reaches printing position. By effecting controlled deceleration of the pallets 35 as they reach printing position, excessive banging and machine vibration is minimized.

To effect the transfer of the respective pallets 35 between the upper and lower flights of the chain drive as the pallets move in the endless path of travel, transfer means 87 and 88 are provided at each end of the machine. See FIGS. 1 and 2. The transfer means 87 and 88 cooperate with the drive means 42 to maintain the respective pallets 35 horizontal and face up as they round the end sprockets 43 and 44. At the feed end of the machine the transfer means 87 includes a lifting sprocket 89 rotatably journalled about a suitable shaft 90 to which a driving sprocket 91 is journalled. As shown in FIG. 1 the periphery of the lifting or transfer sprocket 89 is provided with a series of circumferentially spaced notches 89A which are adapted to engage the rear or lead rollers 40A of the pallets advancing or moving toward the sprocket 89 along the lower flight. The rotation of the lifting sprocket 89 is timed so that the notches will engage with rollers 40A of the approaching pallet 35 as the chain attachment or housing 47 rounds sprocket 43. Timing of the lifting sprocket 89 is attained by driving it from the main drive shaft 76 by an auxiliary chain drive 92.

As best seen in FIG. 1, the auxiliary drive 92 comprises a drive sprocket 93 journalled to the main shaft 76. A complementary sprocket 91 journalled to shaft 90 to which the lifting sprocket 89 connected, and sprockets 93 and 91 are connected in driving relationship by a drive chain 92. The rotation of the lifting sprocket 89 is thus timed to the speed of the main chain drive 42 through appropriate gearing ratios of the respective sprockets.

The arrangement is such that as pallet 35 advances beyond its end sprocket 43, the lead roller 40A engages one of the notches 89A on the lifting sprocket 89 causing the associated end of the pallet to raise as the chain attachment housing 47 rides up on the chain sprocket 43. In this manner both ends of the leading pallet in the lower flight are raised simultaneously as the pallets 35 are advanced from station to station; the top of the pallet being always maintained in a face up position.

At the discharge or other end of the machine 25, the transfer means 88 is defined as a curved guide or channelway for accommodating the end rollers 40B of the respective pallets 35, as they approach the end of the upper flight of drive means 42. As shown in FIG. 2, the transfer means 88 includes a curved rail section 88A which defines an extension of rail 36A. A companion guide rail 88B is spaced from rail section 88A to guide and confine the rollers 40B of pallet 35 as the pallet is transferred from the upper to lower flight of the chain drive 42. As the other end of the pallet is supported by the chain attachment 47, the co-action between the transfer means 88 and end sprocket 44 effect the transfer of the endmost pallet between the upper and lower flights. The curve of rail section 88A and its complementary rail 88B prohibits any vertical drop of the pallet, and as the chain attachment end 46 is guided around end sprocket 44, the following end or rollers 40B are similarly guided by the transfer means 88 resulting in that the pallet is maintained substantially horizontal and face up as it rounds the end of the chain drive 42.

To assist in positioning an article to be printed on the pallet 35 at the feed end of the machine, a feed table 95 is provided. As best seen in FIG. 4, the feed table 95 has an end portion which overlies a portion of the pallet. Guides 95A are provided on the table 95 to facilitate the positioning of the article on the pallet so as to be in proper registration with the screen when the pallet 35 is advanced to a printing station. By locating the guides on the table rather than the pallet the entire surface of the pallet is available for printing. When an operator or an automatic feeder has located the article with respect to the guides 95A on table 95, a portion of the article is supported on the pallet. By actuating the vacuum of the pallet at the feed station, the article is secured thereto, and as the pallet is advanced through the feed station, it will slide the remainder of the article off the feed table and onto the underlying portion of the pallet 35.

OPERATION OF THE MACHINE

The article to be printed is loaded onto the respective pallets 35 as the pallet 35 is moved into the feeding station FS at the feed end of the machine. The article registration onto its respective pallet 35 in the feed station FS is facilitated by means of a feeding table 95 which has a marginal portion overlapping or overlying a portion of the pallet 35 in the feed station. The orientation means or guides 95A provided on the feed table assist in orientating or locating the article to be printed properly upon its respective pallet. When the material or article to be printed is properly orientated on the pallet 35 in the feed station, a switch (not shown) for activating the vacuum pump 52 is energized to draw a vacuum on chamber 43 of pallet 35. The pallet is then advanced to the first printing station whereby the vacuum being drawn on the chamber causes the article to be printed to be adherred thereto and to advance therewith to the printing station. As the pallet 35 approaches the first printing station, the pallet is decelerated by actuation of the deceleration means described and brought to a standstill at the printing station. To effect accurate registration of the pallet 35 and the article supported thereon and to compensate for any slack in the drive chains 42, the piston and cylinder assembly 66 of the registration means is activated. When actuated the push rod 35 advances the connected cam follower 64 to engage the V-notch of the cam locator which will effect displacement of the pallet an amount limited by the engagement of the guide 60 with the guide followers or stops 62 to effect the alignment of the pallet with the printing head. The flexible coupling or bearing 48 between the pallet and drive chains permits the pallet to be displaced. As the trolley 56 of the pallet is engaged in electrical contact with the conducting rail 55A of the electrified track 55, the vacuum pump is maintained activated to maintain a continuous vacuum on the pallet 35 during a printing operation.

With the pallet 35 registered in position at the printing station, the printing head 30 is lowered whereby the screen 32 is properly positioned in registration on the work piece or article to be printed. The actuation of the squeegee 33 in a conventional manner will effect the printing stroke forcing the inks or dyestuff through the design of the stencilled screen and onto the article to be printed. Upon completion of the printing stroke the printing head 30 is raised to an inoperative or non-printing position. As the printing head is being raised to a non-printing position, the piston and cylinder assembly 66 of the registration means is deactivated causing the cam follower 64 to be withdrawn freeing the pallet for advancement to the next station. Then the piston and cylinder assembly 85 is actuated to index the pallet to the next station. In a multiple color printing machine the next station may comprise a second printing station wherein a second color may be printed onto the article. In event that a means is required for effecting the drying of the ink on the article before a second color may be applied, it will be understood that a heater or drying oven may be interposed between successive printing stations. In this manner the printed article may be dried as it advances to the next printing station. However, it will be understood that the utilization of a heater or dryer with the apparatus as described is optional depending upon the nature and type of screen printing operation being performed.

To advance or index the respective pallets 35 to the next station, piston and cylinder assembly 85 is energized to release the ram stop and effect the movement of the indexing means and associated drive means 42.

In doing so, the actuation of the ram 81 on the deceleration lever 82 controls the flow of fluid to the fluid drive motor accordingly to effect the acceleration and/or the deceleration of the pallet driving means.

The construction of the pallets described is such that it constitutes a good heat conductor and when used in conjunction with a dryer or heater, will function to effect the rapid dissipation of the heat therefrom. For this reason dryers may be operated at higher heat temperatures to promote faster drying, and thereby increase the machine output, or conversely reduce the cycling time of the apparatus. Also the pallets are not adversely affected by the heat output of such heating means when utilized in conjunction therewith.

It will be noted that the apparatus described is particularly applicable for use in printing non-porous material. However, it will be understood that porous type material can also be screen printed by the apparatus described. This can be attained either by coating the top of the pallets 35 with a suitable adhesive by which the porous material may then be secured thereto without the intervention of the vacuum means, or optionally the porous material to be printed may be suitably secured to a non-porous backing sheet by suitable adhesive, which backing sheet in turn is maintained in position on the respective pallets through the interaction of the vacuum means.

While the instant invention has been described with respect to a particular embodiment thereof it will readily appreciated and understood that variations and modifications may be made without departing from the spirit or scope of the invention.

What is claimed is:

1. A screen printing machine comprising
a frame,
a printing head defining a printing station mounted on said frame,
a track means on said frame extending along the length of said frame,
a pallet means movably mounted on said track,
said pallet means including spaced apart upper and lower plates and connected end walls defining therebetween a vacuum chamber,
said upper plate having a series of apertures formed therein,
means connected to said pallet means for drawing a vacuum on said chamber,
spaced apart roller means connected to said pallet means disposed in rolling contact with said track means,
a flexible endless drive disposed along each side of said frame,
said endless drive including an upper flight and a lower flight,
a flexible coupling connecting said pallet means to each of said endless drivers,
motor drive means connected to said endless drive to effect the actuation thereof for moving the connected pallet toward and away from said printing station,
means for effecting registration of said pallet means with said printing head when in the printing station,
and transfer means adjacent each end of said endless drives for effecting movement of said pallet means between said upper and lower flights, said transfer means always maintaining said pallet means face up.

2. The invention as defined in claim 1 and including an electric track,
and a sliding contact engaging said electric track,
said contact being connected in circuit to said vacuum drawing means, whereby said latter means is energized when said sliding contact is disposed in electrical contact with said track.

3. The invention as defined in claim 1 wherein said registration means includes a locator having a notch carried on said pallet means,
and a cooperating follower positioned on the frame to engage said locator notch,
and means for activating said follower.

4. The invention as defined in claim 1 wherein said transfer means includes a transfer sprocket adjacent one end of said machine,
and a transfer guide means at the other end of the machine,
means formed on the periphery of said transfer sprocket for receiving said rollers whereby said sprocket when engaged by said rollers functions to transfer said pallet means, face up, between said flights.

5. The invention as defined in claim 1 and including indexing means connected to said motor drive means to limit the movement of said pallet means to said printing station.

6. The invention as defined in claim 1 and including means for decelerating the speed of said motor drive means as said pallet means approaches said printing station.

7. The invention as defined in claim 1 wherein said pallet means includes roller means, and said transfer means at one end of said flight comprising:
   a transfer sprocket,
   means for driving said transfer sprocket in unison with said drive means,
   said transfer sprocket having means formed about the periphery thereof for engaging the roller means connected to said pallets, whereby said transfer sprocket co-acts with said drive means to lift said pallets from the lower flight to the upper flight.

8. In a screen printing machine including a frame having a feed end, and a screen printing head mounted on said frame for movement between printing and non-printing position, the improvement comprising:
   pallet means, said pallet means having an upper and lower member defining a chamber therebetween, said upper member having apertures formed therein,
   a drive means for effecting the movement of said pallet means toward and away from a printing station located below said printing head,
   said drive means comprising an endless flexible drive moving in an endless path along spaced apart upper and lower flights,
   means connecting said pallet means to said endless flexible drive to be driven along said endless path,
   transfer means disposed adjacent the opposed ends of said endless path for effecting the transfer of said pallets between said flights, said transfer means maintaining said pallets in a face-up position throughout the travel thereof along said endless path,
   a vacuum producing means connected to the chamber of said pallet means for drawing a negative pressure on said chamber as said pallet means moves along said endless path,
   a registration means operatively associated with said pallet means for effecting registration of said pallet means with said printing head when in the printing position beneath said printing head.

9. The invention as defined in claim 8 wherein said pallet connecting means includes a resilient coupling to provide for limited relative movement between said pallet means and its flexible drive.

10. The invention as defined in claim 9 wherein said drive means includes:
   a pair of spaced apart endless flexible driving means extending along the longitudinal sides of said frame,
   said resilient coupling means comprising opposed connecting links disposed to opposed sides of said pallet,
   one end of said link being connected to the adjacent flexible drive means,
   a resilient bearing member connected to the other end of said link,
   and a bearing housing connected to the sides of said pallet means for receiving said resilient bearing member.

11. The invention as defined in claim 9 wherein said drive means including a pair of opposed endless flexible drives, said pallet being disposed between said flexible drives,
   said resilient coupling means are oppositely disposed on said pallet means to form a connection with the respective endless drives whereby said flexible drives pull said pallet therebetween to and from a printing station when actuated,
   and said registration means comprising a locating means connected to said pallet and,
   a complementary follower positioned on the frame to engage said locating means,
   and means for activating said follower to effect registration of said pallet means in the printing station.

12. The invention as defined in claim 8 and including a feed table disposed to one side of the pallet means at the feed end of said machine,
   said feed table extending slightly over the side of said pallet means in overlying relationship thereto,
   and means on said table for properly orientating a work piece on said pallet means whereby the workpiece is partly supported on said feed table and partly on said pallet means at the feed end.

13. The invention as defined in claim 8 wherein said pallet means includes roller means, and said transfer means at one end of said flight comprises a transfer guide means positioned to receive the roller means of said pallet, and to cooperate with said drive means for effecting transfer of said pallet means between the upper and lower flight in said face-up position.

14. The invention as defined in claim 8 and including means for maintaining said vacuum producing means actuated as said pallet means is moved toward and away from said printing station.

15. In a screen printing machine having a frame and a plurality of printing heads mounted on said frame to define a plurality of printing stations, each of said printing heads being adapted to support a printing screen and an associated squeegee,
   the improvement comprising,
   a plurality of pallet means supported on said frame by drive means having endless vertically spaced aparts flights,
   said endless drive means for effecting the movement of said pallet means from station to station along said flights in an endless path,
   means for flexibly coupling each of said pallet means to said endless drive means at spaced intervals along said endless drive means,
   means for effecting the registration of said pallet means with its respective printing head when disposed in said printing stations,
   each of said pallet means including spaced apart upper and lower members defining a chamber therebetween, said upper member having apertures formed therein,
   a vacuum producing means connected to each of said pallet means for drawing a negative pressure on the associated pallet chamber,
   means for maintaining said vacuum producing means activated as said pallet means advances through the respective printing stations, and transfer means adjacent each end of said endless path for maintaining said pallet means in a face-up position through the entire travel thereof about said endless path.

16. The invention as defined in 15 wherein said endless drive means comprises:
opposed flexible endless drives extending along the adjacent longitudinal sides of said frame, and
said flexible coupling means including oppositely disposed links,
a resilient bearing connected to one end of each of said links, said resilient bearing being coupled to said pallet means,
and said registration means including a locator on each of said pallet means and an associated follower located on said frame at each printing station,
a means for activating said follower to effect registration of said follower with said locator on said pallet means in a printing station.

17. The invention as defined in claim 16 wherein the direction of movement of said follower is substantially normal to said locator on said pallet means.

* * * * *